United States Patent [19]
Korshak

[11] Patent Number: 5,524,736
[45] Date of Patent: Jun. 11, 1996

[54] MASTER CYLINDER BLEEDING

[76] Inventor: Maurice J. Korshak, 144 Baymeadows Dr., Jackson, Tenn. 38305

[21] Appl. No.: 397,929
[22] Filed: Mar. 3, 1995
[51] Int. Cl.⁶ ..................................................... B60T 11/30
[52] U.S. Cl. ............................................ 188/352; 411/412
[58] Field of Search ........................... 188/352; 411/412, 411/413, 411; 403/299

[56] References Cited

U.S. PATENT DOCUMENTS

| 470,238 | 3/1892 | Goodman | 403/299 |
|---|---|---|---|
| 1,849,069 | 3/1932 | Bridges | 411/412 |
| 2,382,019 | 8/1945 | Miller | 411/412 |
| 3,499,287 | 3/1970 | Schrader . | |
| 4,103,492 | 8/1978 | Sakazume . | |
| 4,103,762 | 8/1978 | Sawyer . | |
| 4,170,280 | 10/1979 | Schwarz . | |
| 4,198,100 | 4/1980 | Nogami . | |
| 4,236,549 | 12/1980 | Salzmann . | |
| 4,497,176 | 2/1985 | Rubin et al. . | |
| 4,800,725 | 1/1989 | Kaulig et al. . | |
| 4,865,171 | 9/1989 | Miller . | |
| 4,979,367 | 12/1990 | Crescentini | 188/352 |
| 5,310,252 | 5/1994 | Stewart, Jr. . | |
| 5,381,662 | 1/1995 | Ethen et al. . | |

FOREIGN PATENT DOCUMENTS 2017240  10/1979  United Kingdom .
2042662   9/1980  United Kingdom .
2074271  10/1981  United Kingdom .

Primary Examiner—Matthew C. Graham
Attorney, Agent, or Firm—Richard C. Litman

[57] ABSTRACT

A master cylinder and novel screws for practicing a novel method of bleeding the master cylinder. The screws are tightened into the orifices conventionally employed for the attachment of brake lines. With these orifices plugged, the brake fluid reservoirs are filled and the piston is forced into the high pressure position. Air or other gas initially occupying the main bore is forced into the reservoirs, and the bubbling is highly visible. When the return spring returns the piston to its original position, fluid is sucked from the reservoirs into the main bore. When bubbling ceases, the master cylinder is considered bled, and is prepared for final connection to the brake system. The screws are removed and brake lines are attached instead. Preferably, the screws are stepped, and include a section of relatively larger diameter and a section of relatively less diameter. Stepped screws require only one wrench size for tightening and loosening, and are interchangeable among threaded discharge orifices of different diameters. Orifices of different diameters are conventionally provided to enable a mechanic to connect brake lines to correct corresponding circuits of the master cylinder. The novel method eliminates cumbersome bleeding equipment, and reduces likelihood of fluid leaks and contamination by exposure to external apparatus.

2 Claims, 1 Drawing Sheet

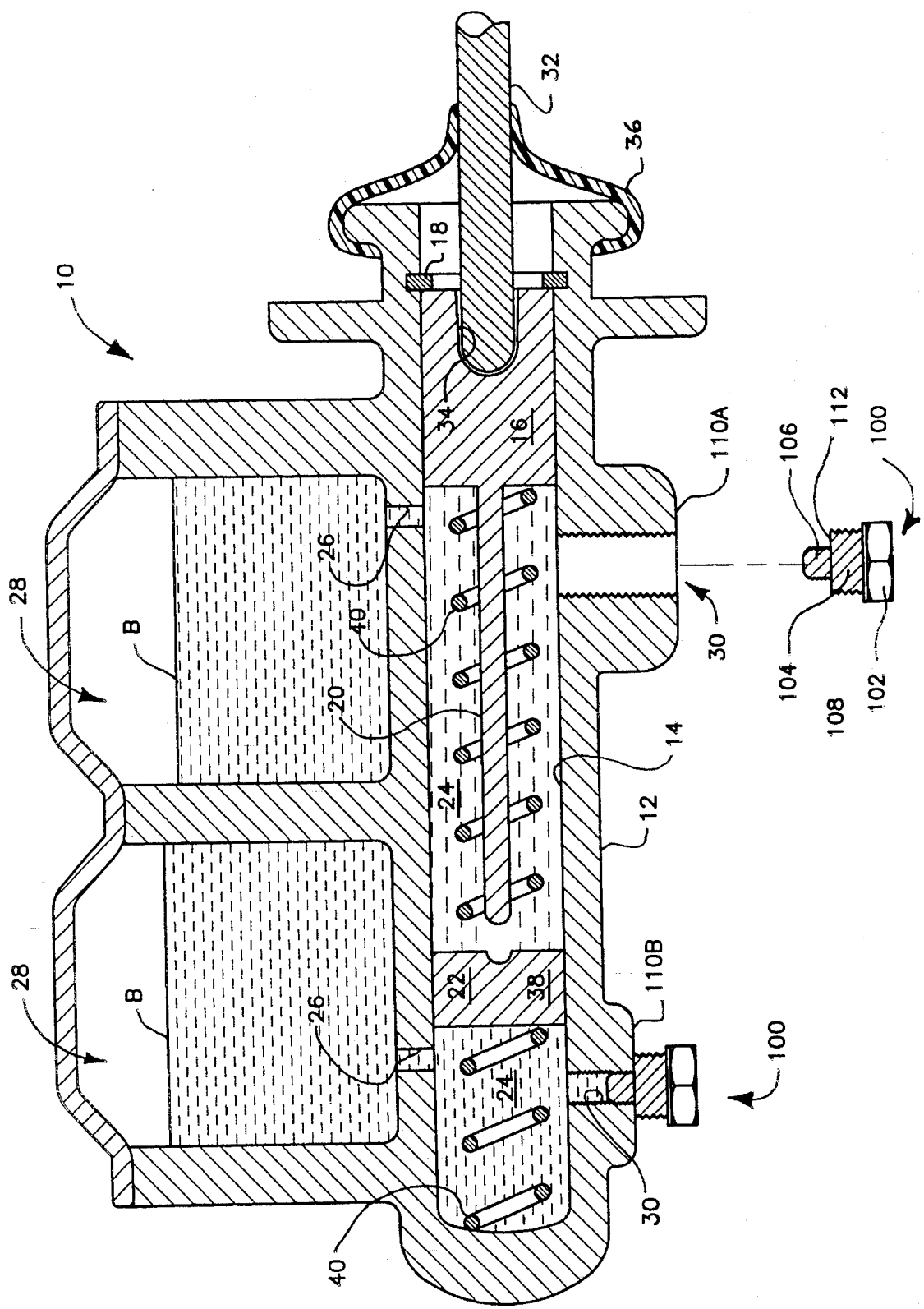

5,524,736

MASTER CYLINDER BLEEDING

BACKGROUND OF THE INVENTION

1. Field of the Invention

The present invention relates to apparatus and method for readily purging air from a new brake master cylinder assembly, thus filling the master cylinder with brake fluid. This is a step which is preliminary to installing a new master brake cylinder in a motor vehicle, which process requires that all air be purged from the fluid circuit.

2. Description of the Prior Art

When a new master cylinder is to be installed in a motor vehicle, it must be purged of air or other gasses, and filled with brake fluid. This operation is performed when the vehicle is first manufactured, and may also be required periodically during the service life of the vehicle should the original master cylinder fail. In either case, purging of air is required for successful operation under the pressure normally imparted to the system to operate the brakes.

Master cylinders have become more complicated over time. For example, redundant circuits have been incorporated therein which require an equal number of discharge orifices for connection of hoses conducting pressurized fluid to each wheel.

Individual owners and even seasoned mechanics will occasionally fail to purge the cylinder effectively, and may return the new or rebuilt master cylinder to the manufacturer as defective. A variety of methods and apparatus to accomplish successful purging have been proposed in the prior art.

U.S. Pat. No. 4,800,725, issued to Robert Kaulig et al. on Jan. 31, 1989, teaches that air may be forced from a master cylinder bore by plugging threaded orifices and forcing the air into the fluid reservoir. However, the concept of filling the cylinder bore with stored brake fluid by relying upon a return stroke powered by a master cylinder return spring is not shown or suggested.

Plugging a threaded orifice with a screw is shown in U.S. Pat. No. 4,979,367, issued to Dino Crescentini on Dec. 25, 1990. However, the screw forms a permanent part of the master cylinder, and is provided to enable a user to selectively seal one orifice while employing a nearby counterpart for connection to the brake circuit. The novel feature is that the master cylinder is formed having a plurality of threaded appertures for connection to the brake circuit. One orifice is selected for connection, and the others are unnecessary, and must be plugged to enable operative pressure to be developed. In this respect, this patent teaches away from the present invention.

U.S. Pat. Nos. 4,170,280, issued to Maurice L. Schwarz on Oct. 9, 1979, 4,236,549, issued to Donald F. Salzmann on Dec. 2, 1980, 4,497,176, issued to Frank D. Rubin et al. on Feb. 5, 1985, 4,865,171, issued to Ronald J. Miller et al. on Sep. 12, 1989, 5,310,252, issued to Howard C. Stewart, Jr. on May 10, 1994, and 5,381,662, issued to Richard M. Ethen et al. on Jan. 17, 1995, and U.K. Pat. Application No. 2,074,271, dated Oct. 28, 1981, all illustrate various aspects of bleeding master cylinders and hydraulic brake systems. These patents neither show nor suggest the novel apparatus and method.

None of the above inventions and patents, taken either singly or in combination, is seen to describe the instant invention as claimed.

SUMMARY OF THE INVENTION

The present invention provides a kit for promoting readily accomplished, successful purging of a master cylinder, and a method for using the kit. The apparatus includes a master cylinder and a solid screw having threads corresponding to the threads of the outlet orifice. After the master cylinder is permanently affixed to a motor vehicle, usually in the engine compartment at the firewall, a brake fluid conduit, herein called a brake line, is connected to the outlet orifice. The brake line conducts hydraulic pressure developed in the master cylinder to each wheel brake assembly.

The screw is solid in the sense that it lacks an internal orifice communicating between the ends. Brake bleeding valves for bleeding wheel cylinders and calipers are typically constructed to comprise a screw having such an internal orifice. The purpose of the orifice is to discharge brake fluid during a bleeding operation.

When performing the initial bleeding or purging of the cylinder, the screw is threaded into the discharge orifice, the reservoir is filled with brake fluid, and the piston is pressed forwardly, in the direction that results from brake operation. Since air cannot be discharged through the fluid discharge orifice, it is forced instead upwardly into the reservoir. The return spring conventionally furnished to return the piston to its initial position then returns the piston, and fluid is sucked from the reservoir into the cylindrical bore housing the piston. This operation is repeated until no bubbles of air are visible in the brake fluid sitting in the reservoir. The reservoir is replenished with brake fluid periodically as fluid enters and fills the bore.

When bubbles are eliminated, the cylinder is purged of air and ready for final connection to the brake line. This initial purging or bleeding may be performed with the master cylinder mounted in the vehicle for support, or in a support specifically designed for this operation. When making final connection, the screw is removed, and a brake line is installed in the threaded orifice. Brake lines are typically provided with threaded compression nuts which thread into the orifice. Final bleeding of the brake line and wheel cylinders or calipers may then proceed.

This method improves over prior art bleeding methods because the additional equipment required for bleeding is limited to a single component having no moving parts, once installed. Additional benefits accrue from maintaining brake fluid inside the master cylinder during bleeding. Methods which return fluid discharged from the discharge orifice back to the reservoir or to a storage container are frequently difficult to monitor for bubbles. By contrast, bubbles rising within the filled reservoir from below are quite conspicuous. There is also reduced opportunity in the novel method for leaking or contamination of fluid which, in conventional circuits, exits the master cylinder while being recirculated.

In a second embodiment of the invention, the master cylinder is of the type providing a plurality of independent hydraulic circuits. The purpose is to have at least one functional hydraulic circuit if another circuit fails. Master cylinders of this type include a single cylindrical bore, the piston being designed to pressurize fluid at two unconnected points. Two fluid reservoirs and two outlet or discharge orifices are provided.

It is automotive industry practice to form the two discharge orifices to be of different diameters having, obviously, different threading. This intentional arrangement eliminates any chance that a careless mechanic will connect the brake lines to the wrong threaded orifices.

Thus, it becomes necessary to accommodate two different dimensions and associated threads when installing screws for plugging the several orifices. For master cylinders of this type, the invention preferably includes a plurality of stepped screws. The threading patterns accommodate the two orifices, and may be interchangeably threaded into either orifice. Different threads will engage the corresponding threading of the respective orifice, and one size screw will therefore fit both orifices. One screw for each orifice is provided, there usually being two orifices and therefore two screws. While two screws each having one threaded portion could be employed, it is more convenient to provide identical, interchangeable screws. For example, only one wrench is required to tighten and loosen the interchangeable screw within either orifice. If employing standard threaded screws, it would be possible that the two sizes required would have heads of different sizes also. In this case, two wrench sizes would be required.

The screws also perform a second function. When a new, dry master cylinder is shipped and stored while in transit from the factory, the screws are installed in the orifices. The screws thus cover and protect the threads until the moment of utilization.

Accordingly, it is a principal object of the invention to provide a method of bleeding a master cylinder in which brake fluid is maintained within the master cylinder.

It is another object of the invention to minimize complexity of apparatus and method employed to bleed a master cylinder.

It is a further object of the invention to provide plugs for plugging the discharge orifices of a master cylinder during bleeding.

Still another object of the invention is to provide plugs which are interchangeable with respect to the various fluid discharge orifices of a master cylinder providing plural circuits.

An additional object of the invention is to provide plugs which require only one wrench or like tool for installation in and removal from the master cylinder.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWING

The Drawing FIGURE is a side elevational view of a master cylinder and the novel screws, mostly in cross-section and partially exploded.

DETAILED DESCRIPTION OF THE PREFERRED EMBODIMENTS

The Drawing FIGURE shows a representative conventional master cylinder 10. In this view, components significant to the invention are shown, and other components are omitted for clarity. Master cylinder 10 is conventional, and the significant components and operation will be briefly reviewed. Master cylinder 10 includes the usual housing 12 and main bore 14. Main bore 14 is seen to be open to the atmosphere at the end to the right, as shown in this Drawing FIGURE, and to have a closed or sealed end at the left. A primary piston 16 occupies main bore 14 and is retained by a clip 18. Primary piston 16 has a finger 20 which will contact a secondary piston 22 after a limited degree of travel. Pistons 16 and 22 are slidably disposed within main bore 14, and develop pressure when urged to the left, as depicted.

Thus, two high pressure chambers 24 are defined within main bore 14.

Brake fluid B is supplied to chambers 24 through respective passageways 26 communicating between each of two reservoirs 28 for storing brake fluid and located above main bore 14, and an associated chamber 24. Pressurized fluid is discharged to brake lines (not shown) through discharge orifices 30. Discharge orifices 30 have female threading for accepting a threaded compression nut (not shown) which secures a brake line (not shown) thereto when the master cylinder is permanently connected to a brake system.

Each associated group including a reservoir 28, passageway 26, chamber 24, and discharge orifice 30 will be termed a hydraulic circuit. As depicted in the Drawing FIGURE, there are two hydraulic circuits.

Typical master cylinders also include an actuating rod 32 which seats in a depression 34. A flexible boot 36 seals the open end of main bore 14. Finger 20 contacts secondary piston 22 at a depression 38. Return springs 40 are provided to return pistons 16,22 to their original positions after each pressure stroke by urging pistons 16,22 towards the open end of main bore 14, and to space apart pistons 16,22 so as to define both chambers 24.

Contemporary brake master cylinders typically include two hydraulic circuits to provide partially redundant braking systems in the event of failure of one system. In the past, and in some vehicles today, a brake master cylinder has included a single hydraulic circuit. If there is only one hydraulic circuit, then only primary piston 16 is provided.

The present invention is preferably practiced in the form of a kit incorporating a master cylinder 10 and at least one screw 100 to practice a novel bleeding method. To bleed master cylinder 10, when new and devoid of brake fluid, or at any time purging of air is necessary, screws 100 are threaded into orifices 30. Each screw 100 has a head 102 for engaging a hand tool (not shown), a section 104 of relatively greater diameter, and a section 106 of lesser diameter. Sections 104 and 106 include male threading engageable with the threads of the two discharge orifices 30.

While head 102 is depicted as having flat facets for engaging the surfaces of a wrench (not shown), this is merely representative and may have additionally or alternatively a recess for engaging a screw driver, a hexagonal or other key, or still other tools.

Screw 100 also has a shoulder 108 formed at the junction of section 104 and head 102. When screw 100 is threaded into the larger orifice 30, threads on section 104 will mate with threads formed in orifice 30. Shoulder 108 will abut the boss 110A of housing 12, and will seal the hydraulic circuit against leaks.

Threads of section 106 will correspond to threads of the smaller orifice 30, and shoulder 112 formed at the junction of sections 104 and 106 will form the seal at boss 110B.

When bleeding master cylinder 10, air bubbles upwardly into reservoirs 28, where the bubbles (not shown) are quite visible. Reservoirs 28 are preferably located above main bore 14 and are open at the top to promote visibility.

It will be appreciated that the same principles apply to a master cylinder provided with one hydraulic circuit. In this case, there will be only one screw provided for plugging the discharge orifice, and there will be no need for stepping this screw.

It is further possible that a master cylinder having plural hydraulic circuits will have identically dimensioned and threaded discharge orifices. A plurality of screws is provided, one for each hydraulic circuit, and again, the screws need not be stepped.

In the preferred embodiment, which corresponds to widely accepted practice today, a master cylinder has two hydraulic circuits of different orifice diameters and threadings, and two stepped screws are provided. The screws are interchangeably threadable to either discharge orifice and require only one size wrench or other tool to tighten and loosen all screws.

It would be possible for the embodiment of the invention providing two hydraulic circuits to provide more than two circuits. The number of reservoirs, auxiliary pistons, communicating passageways, and discharge orifices may be increased according to the number of hydraulic circuits desired for any given application.

While the present invention has been described with respect to a braking system for a motor vehicle, the same principles will apply to hydraulic servomechanisms generally, regardless of the actual application.

It is to be understood that the present invention is not limited to the embodiments described above, but encompasses any and all embodiments within the scope of the following claims.

I claim:

1. A kit for providing and bleeding a master cylinder having a housing including means defining a main bore having a first end open to the atmosphere and a second sealed end, a piston slidably disposed within said main bore for developing hydraulic pressure, a return spring disposed within said main bore urging said piston toward said first end of said main bore, and means defining a plurality of hydraulic circuits, each comprising means defining a reservoir for storing brake fluid located above said main bore, means defining a passageway communicating between said main bore and said reservoir, and means defining a discharge orifice communicating with said main bore, said discharge orifice having female threading, said kit comprising:

a plurality of solid screws equal in number to the number of said hydraulic circuits present, each said solid screw having a plurality of sections including male threading, at least one shoulder between each section of said male threading, each said section differing in diameter from other said section of the same said solid screw and corresponding to said female threading of a said discharge orifice, and said at least one shoulder engageable with said housing of said master cylinder when said solid screw is fully tightened within said discharge orifice, whereby each said solid screw is interchangeably threadable to different discharge orifices.

2. A method of purging air from a vehicle's installed master cylinder assembly having multiple reservoirs with different sized discharge orifices, comprising the following steps:

disconnecting each existing hydraulic line from each different sized discharge orifice;

plugging each discharge orifice with a solid screw having identical configuration including a head and shoulders of the same size and shape with multiple threading of different diameters in a decreasing order separated by at least one of said shoulders;

pressurizing the hydraulic fluid to substantially eliminate the air in each of said multiple reservoirs; and reconnecting each hydraulic line to each different sized discharge orifice by removing each said solid screw;

whereby a single tool is employed to perform the insertion and removal of each said solid screw having the same multiple threading and the same sized and shaped head.

* * * * *